Feb. 6, 1968     L. SPENADEL ET AL     3,367,268
HYBRID ROCKET PROPELLENT GRAIN
Filed Oct. 5, 1959
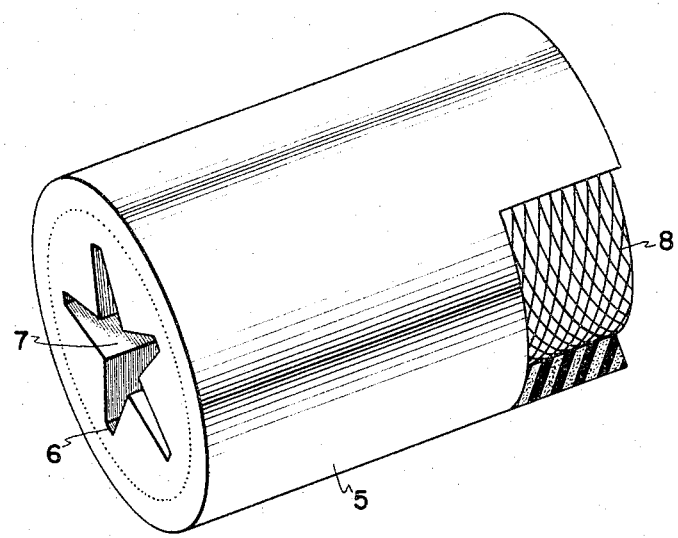
LAWRENCE SPENADEL
HERMAN BIEBER     INVENTORS
WILLIAM J. SPARKS
BY R. D. Manahan
PATENT ATTORNEY 3,367,268
HYBRID ROCKET PROPELLANT GRAIN
Lawrence Spenadel, Elizabeth, Herman Bieber, Kenilworth, and William J. Sparks, Westfield, N.J., assignors to Esso Research and Engineering Company, a corporation of Delaware
Filed Oct. 5, 1959, Ser. No. 845,055
12 Claims. (Cl. 102—102)

The present invention relates to novel cellular compositions, and the preparation thereof, which may be used as supports for fuels and/or oxidizing agents employed in the propulsion of rockets. Specifically, it concerns reinforced sponges or foams that have outstanding tensile strengths and therefore are capable of withstanding the severe stresses present in the burning chambers of rocket devices.

A rocket propulsion device, as used herein, is a rigid container for matter and energy so arranged that a portion of the matter can absorb the energy in kinetic form and subsequently eject it in a specified direction. The type of rocket to which the invention has particular application is that which is generally designated as a pure rocket, that is to say, a rocket in which the means producing the thrust does not make use of the surrounding atmosphere. The rocket is propelled by contacting the fuel or propellant in a combustion chamber with a suitable oxidizing agent which produces burning and causes the release of energy at a high but controllable rate from the combustion chamber. The solid bi-propellants normally used in rockets consist of solid fuel and solid oxidizing agents. While solid oxidizing agents are highly useful, they are usually less effective than liquid oxidizing agents because the latter, in most instances, permit attainment of higher specific impulses. One way to use liquids in solid propellants consists of soaking them up in a sponge or foam matrix. Strong elastic solid propellants are desirable in pure rockets since the propellants are generally subjected to severe stresses, of the order of 300 to 1500 p.s.i., which in some instances cause cracks and fissures that adversely affect the burning characteristics of the propellant and sometimes result in detonation.

It is an object of this invention to provide a strong sponge capable of withstanding considerable stress. Another object is to provide a hybrid rocket propellant which can be used in pure rockets and which resists cracking while burning in the rocket's combustion chamber.

In accordance with the present invention, rubbery cellular substances, especially sponges, are reinforced and strengthened with high tensile strength materials. It has been found that certain metal, plastic and ceramic fibers and screens are highly suitable strengthening materials.

The accompanying drawing is a perspective view of a propellant grain with a portion broken away to show the strengthening material.

The strengthening material can occupy only a small part of the total weight of the rocket motor, e.g. less than 10 wt. percent and preferably about 0.1 to 2 wt. percent, since in many instances it has little or no fuel value. The fibers should be imbedded or incorporated in the cellular substance of the propellant grain in a manner which gives the greatest improvement in tensile strength without appreciably affecting the burning properties of the grain. To be specific, it can be sandwiched between two or more sponges and then the resulting composition can be cured. The fiber selected should be relatively thin, e.g. 0.001 to 0.10 inch thick, and may be oriented in a layer or a random fashion. The fibers are preferably in a woven or interlacing form to enhance their strengthening action. Moreover, they, if desired, may be pretreated with phenolformaldehyde resins, etc., to improve their adhesion to the polymer which is in the matrix of the motor's cellular substance.

The thermal conductivity of the fiber should be similar to the rest of the propellant system, e.g. the cellular sponge and its contents. Therefore the $k$ of the reinforcing material will usually run between 0.05 and 0.5 B.t.u./hr.-ft.$^2$-° F./ft. If the fibers are primarily oriented parallel to the flame front, their thermal conductivity will have little influence on the propellant's burning rate. Conversely, if the orientation is normal to the flame front, the value of $k$ is important. Conductive metal fibers can increase burning rates in a slow burning propellant of lower thermal conductivity. Thus, while the principal purpose of the invention is to strengthen sponge propellants, convenient modifications in burning rate may also be obtained by the use of certain fibers.

The term fiber as used herein means any thread-like material capable of being woven or interlaced. Among the fibers which may be used in accordance with the invention are polyolefin fibers, rayon fiber, nylon fiber, ceramic fiber, metal wires or screens, glass fiber, cotton and in general any fiber cloth or screen with appreciable tensile strength. The fiber may be synthetic or natural, inorganic or organic, provided it has a suitable thermal conductivity and imparts a strength which is at least 50% greater than the tensile strength of the non-reinforced sponge or foam. The strengthening material should not be too rigid because it is desirable to have the solid motor flexible. Moreover, it should not reduce the elongation of the cellular substance below 20% since at least this amount of elasticity is usually necessary to prevent the motor from breaking up while burning. In general, it will be noted hereinafter that the best results are obtained with synthetic organic polymers, such as rayon, and wire screens, such as aluminum screens, having a mesh of about 1 to 60. These fibers have tensile strengths of at least 1000 p.s.i., e.g. 1500–4000 p.s.i.

The cellular substances in the rocket motor may consist of any suitable high molecular weight polymer, especially one which is rubbery in nature, that is useful in hybrid propellent grain for rocket motors. The foam or sponge may be either closed cell or open cell. In an open cell sponge the cells are interconnecting and connect with the surrounding atmosphere. The preferred polymers are those which contain a hydrocarbon backbone such as butyl rubber, halogenated butyl rubber, styrene-butadiene rubber (SBR), polychloroprene rubber, hexafluoropropylene, vinylidene fluoride copolymer and the like. The polymer is generally compounded with a light metal fuel, e.g. powdered aluminum, boron, beryllium or lithium, a blowing agent and a curing agent, such as sulfur. The compounded polymer is then subjected to an elevated temperature, preferably about 250–350° F., in a mold or oven for several hours to form a strong cellular body. The cellular propellant grain for rocket motors which may be strengthened in accordance with the present invention are described in United States patent application 817,970 filed June 2, 1959, in the name of John P. Longwell and patent application 820,826 filed June 16, 1959, in the name of Herman Bieber et al.

The most commonly used cellular substance is an open cell sponge which is sometimes defined as a sponge capable of absorbing more than about 5 wt. percent of water. A typical recipe for such a sponge is as follows:

| Components | Parts by Weight | |
|---|---|---|
| | General | Preferred |
| Polymer | 100 | 100 |
| Fuel | 10-400 | 20-300 |
| Blowing agent | 5-30 | 10-20 |
| Activator | 2-20 | 4-12 |
| Accelerator | 0-20 | 1-5 |
| Curing agent | 0-20 | 1-12 |
| Metal oxide | 0-20 | 1-10 |

The fuel, which is preferably a solid, should be sufficiently stable to permit ordinary processing of the compounded polymer. Among the solid fuels which may be used in the above recipe are powdered metal and metal-containing substances in which the metal is selected from Groups I to IV of the Periodic Chart of Elements. While fuels such as lithium hydride and titanium are useful, the preferred fuels are the Groups II and III metals, e.g. aluminum, beryllium, boron, magnesium and their hydrides. The blowing agent is generally a material which will decompose at elevated temperatures to produce oxygen- or nitrogen-containing gases that cause the formation of numerous open cells in the solid polymer. However, other nondecomposing blowing agents such as low boiling paraffinic hydrocarbons in the $C_4$ to $C_5$ range may be used. Suitable blowing agents include sodium carbonate, dinitrosopentamethylene tetramine, azoisobutyric nitrile and pentane. It is sometimes desirable to use an activator, such as urea or stearic acid to initiate the action of certain blowing agents, e.g. dinitrosopentamethylene tetramine or sodium bicarbonate.

With regard to curing the compounded polymer accelerating agents such as tellurium diethyl dithiocarbamate and tetramethyl thiuram disulfide may be employed to assist the curing agent. The curing agent is usually sulfur when natural rubber, SBR or butyl rubber is the polymer, sulfur and zinc oxide when halogenated butyl rubber is used and hexamethylene diamine when copolymers containing large amounts of fluorine are used in the preparation of the sponge. It is also sometimes desirable to compound the polymer with a metal oxide, such as zinc oxide or magnesium oxide, in addition to the curing agent, in order to obtain good physical properties in the sponge. The compounded polymer should be cured at an elevated temperature which is generally between 200 and 400° F. for at least one minute, e.g. 5-30 minutes. Where the polymer is natural rubber, butyl rubber, halogenated butyl rubber or styrene-butadiene rubber, it has been found that heating the compounded rubber at 250-350° F. for about 10-30 minutes in a closed mold produces a sponge which has excellent physical characteristics. The aforementioned rubbers generally have viscosity average molecular weights of at least 100,000 and sometimes as high as 2,000,000 or more.

Butyl rubber, a term well known in the ruber art, e.g. Chapter 24 in "Snythetic Rubber" edited by G. Whitby is a rubbery copolymer comprising a major proportion of a monolefin having 4 to 7 carbon atoms and a minor proportion of a multiolefin having 4 to 8 carbon atoms. The most commonly employed monoolefin is isobutylene, although other monoolefins such as 3-methyl-butene-1 and 4-methyl-pentene-1 may be used. Suitable multiolefins, which are generally conjugated diolefins, include isoprene, butadiene-1,3, dimethyl butadiene-1,3, piperylene and the like. Most of the copolymers contain about 90 to 99.5 wt. percent isoolefin and 0.5 to 10 wt. percent diolefin, which in most instances is isoprene. The polymerization is generally carried out at a low temperature, e.g. between −50 and −165° C., in the presence of a Friedel-Crafts catalyst, such as aluminum trichloride, dissolved in a lower alkyl halide, such as methyl chloride, ethyl chloride, etc. Their preparation is fully described in U.S. Patent 2,356,128. Butyl rubber has a viscosity average molecular weight between about 200,000 and 1,500,000 or more and a Wijs iodine number between about 1 and 50.

The physical and chemical properties of butyl rubber may be modified by introducing a small quantity of halogen into the polymer. In producing halogenated butyl rubber, unmodified, unvulcanized butyl rubber is carefully halogenated until it contains about at least 0.5 wt. percent (preferably at least about 1.0 wt. percent, but not more than about "X" wt. percent of combined chlorine or 3 "X" wt. percent combined bromine wherein:

$$X = \frac{M_3 L}{(100-L)M_1 + L(M_2+M_3)} \times 100$$

and $L$ = mole percent of the multiolefin in the polymer
$M_1$ = molecular weight of the isoolefin
$M_2$ = molecular weight of the multiolefin
$M_3$ = atomic weight of the halogen Restated, there should be at least about 0.5 wt. percent of combined halogen in the polymer but not more than about one atom of chlorine or 3 atoms of bromine combined in the polymer per molecule of multiolefin present therein; i.e. per double bond in the polymer.

Styrene-butadiene rubber is made by copolymerizing the monomers in an aqueous emulsion at −40 to 120° F. in the presence of a peroxide or persulfate catalyst. The copolymer generally contains about 80% butadiene and 20% styrene.

The open cells of the foam or sponge are at least partially filled with a liquid oxidizing agent capable of reacting rapidly with the fuel upon ignition to produce low molecular weight gases. The liquid oxidizing agent should not attack the sponge at ambient temperatures. Many of the oxidizing agents useful in conventional bipropellant systems may be employed. Among the oxidizing agents which may be used in the propellants are hydrogen peroxide, white fuming nitric acid or red fuming nitric acid, tetranitromethane, bromotrifluoride, etc. The preferred oxidizing agents are inorganic and organic nitrogen-fluoride compounds; the latter compounds may contain 1 to 4 carbon atoms. The sponge may be immersed in the oxidizing agent or otherwise subjected to treatment so that it soaks up a substantial amount of oxidizing liquid. In order to serve as a high energy propellant, the fully treated sponge or foam should contain about 75 to 95 wt. percent fuel and oxidizing agent, while the polymer matrix (intercellular substance), exclusive of the fuel but including the polymer and curatives should not comprise more than 25 wt. percent and preferably less than 10 wt. percent, of the finished rocket propellant.

The strengthening materials are preferably imbedded in the sponge prior to curing it to enhance the adhesion of the material to the sponge. It may be desirable, in the case of nylon or rayon fabric, to dip the fabric in a latex comprising the polymer used in the sponge and a phenol-formaldehyde resin. This pretreatment or coating substantially increases the adhesion of the fabric to the sponge. On the other hand, the cured sponge may be adhered to the strengthening material by means of a suitable adhesive, such as methyl cellulose.

Turning now to the drawing, there is shown a bi-propellant for a rocket motor comprising a cylindrical open cell sponge 5 which has an internal burning surface 6 in the shape of a star. The star-shaped conduit 7 is located in the center of sponge 5 and is parallel with the longitudinal axis of said sponge. Conduit 7 may be filled with any igniting substance, e.g. black powder, not shown, which can be ignited by a suitable means, such as an electric match, not shown. Of course, the motor need not be cylindrical nor have an internal burning surface, i.e. it may burn like a cigarette. The cells of sponge 5 are filled with liquid or semi-liquid oxidizer, e.g. gelled hydrogen peroxide, and its matrix contains fuel, preferably a powdered metal or metal hydride. It is, of course, sometimes desirable to employ a closed cell sponge, in which case the cells would not be interconnected or visible. Imbedded in sponge 5 is at least one layer 8 of woven fiber, such as aluminum screening or rayon fabric, which strengthens the sponge and helps to prevent it from cracking when the rocket motor is burning. The outer surface of sponge 5 may be coated with a layer of nitrocellulose, rubber cement, etc. which prevents the loss of any oxidizer and also serves to adhere the outer surface of the motor to the inner wall of the rocket's combustion chamber.

The following specific examples of the invention are given in order to provide a better understanding of it.

Isobutylene-isoprene butyl rubber having a viscosity average molecular weight of 400,000 and a mole percent unsaturation of about 1.5 was compounded to make an open cell sponge according to the following recipe:

*Recipe*

| Component: | Parts by weight |
|---|---|
| Butyl rubber | 100 |
| Aluminum powder | 100 |
| Zinx oxide | 8 |
| Sulfur | 5 |
| Tetramethylthiuramdisulfide | 1.5 |
| Benzothiazyldisulfide | 1 |
| Paraffinic oil | 30 |
| Stearic acid | 10 |
| Soda | 15 |

*Compounding procedure*

| Cycle time, minutes: | Operation |
|---|---|
| 0 | Butyl on cold mill. |
| 3 | Add aluminum powder. |
| 10 | Add zinc oxide. |
| 12 | Add ½ of stearic acid. |
| 13 | Add remaining stearic acid. |
| 14 | Add curatives. |
| 16 | Add paraffinic oil. |
| 18 | Mixture ready for curing. |

1/16" thick slabs of the fully compounded butyl rubber were placed in a closed mold with alternating layers of the selected reinforcing material. In each case compounded butyl rubber comprised the outer layers and each strengthened sponge, which was 6 x 6 x ½", contained two layers of fiber. The compounded butyl rubber was cured at 310° F. in the above-mentioned mold and after cooling each sponge was tested for tensile strength in a Scott tensile strength machine. The tensile strengths of the reinforced sponges are compared with the control in the following table:

*Effect of various reinforcing materials on cellular rocket motors*

| Reinforcing material: | Tensile strength (p.s.i.) |
|---|---|
| Control | 10 |
| Copper wire strands | 16 |
| Glass fiber | 34 |
| Cheesecloth | 37 |
| Rayon cord (strands) | 52 |
| Rayon fabric | >400 |
| Aluminum screen | >200 |

The elongation of the above reinforced sponges were all greater than 20%. The data in the table show that while strands of wire and fiber improve the tensile strength of the rocket motor, the best results are obtained with woven fibers, such as rayon tire cord fabric and aluminum screen. The aluminum screen used in this example had a 30 mesh and the wires were 0.009 inch in diameter. The square woven viscose rayon chafer fabric had a 1100 denier and 20 x 20 strands per inch. The viscose rayon fabric was pretreated by dipping it at room temperature in an aqueous solution consisting of 300 grams of 55% butyl rubber latex (the same used in the propellant), 40 grams of 37% formaldehyde, 24 grams of resorcinol and 600 grams of water. The fabric, after drying, picked up 8 wt. percent of the dip.

Each of the cured sponges was immersed in hydrogen peroxide (oxidant) and it was noted that the immersed sponges each contained about 75 wt. percent of the liquid oxidant at room temperature. When the filled sponges are ignited they burn satisfactorily.

It is not intended to restrict the present invention to the foregoing embodiment, but rather it should only be limited by the appended claims in which it is intended to claim all the novelty inherent in the invention.

What is claimed is:

1. A hybrid rocket propellent grain which comprises a solid polymeric cellular rubbery substance forming an intercellular matrix containing a powdered solid fuel imbedded in the matrix, cells of said intercellular matrix containing liquid oxidizing agent, and reinforcing fiber imbedded in the matrix.

2. A hybrid rocket propellent grain which comprises a blown sponge of a solid polymeric rubber forming an intercellular matrix, a solid fuel powder compounded with the rubber and imbedded in the matrix, cells of the sponge containing a liquid oxidizing agent, and at least one layer of a woven fiber having the tensile strength of at least 1000 p.s.i. imbedded in the matrix.

3. A propellent grain according to claim 2 in which the polymeric rubber is a hydrocarbon rubber.

4. A propellent grain according to claim 2, in which the woven fiber is a metal screen.

5. A propellent grain according to claim 2, in which the woven fiber is rayon fabric.

6. In a rocket propellent grain which comprises a rubbery sponge having an intercellular matrix containing a solid light metal fuel powder, said metal being selected from Groups II and III of the Periodic Chart of Elements and open cells containing a liquid oxidizing agent, the improvement which comprises increasing the strength of the grain by having at least one layer of a woven fabric which has a thermal conductivity similar to that of said fuel and a tensile strength of at least 1000 p.s.i. imbedded in the rubbery matrix of the sponge.

7. A propellent grain according to claim 5, in which the woven fiber is an aluminum screen.

8. A propellent grain according to claim 5, in which the woven fiber is nylon fabric.

9. A propellent grain according to claim 6, in which the woven fabric is less than 10 wt. percent of the total weight of the grain.

10. A propellent grain according to claim 6, in which the rubbery sponge matrix contains a cured hydrocarbon rubber.

11. A propellent grain according to claim 6, in which the rubbery sponge matrix contains cured butyl rubber.

12. A rocket propellent grain which comprises a solid rubbery polymeric sponge having an intercellular matrix of cured rubbery polymer compounded with a solid fuel powder, having fine interlaced fibers that increase the tensile strength of the matrix imbedded in the matrix, and having cells containing a liquid oxidizing agent for the fuel and the cured polymer in the matrix.

(References on following page)

References Cited

UNITED STATES PATENTS

| | | | |
|---|---|---|---|
| 2,816,418 | 12/1957 | Loedding | 60—35.6 |
| 2,851,918 | 9/1958 | MacLeod | 86—1 |
| 2,863,353 | 12/1958 | Brimley | 86—1 |
| 2,920,443 | 1/1960 | Higginson | 60—35.6 |
| 552,919 | 1/1896 | Maxim | 102—98 |
| 1,530,692 | 3/1925 | Paulus | 102—49 X |
| 2,802,332 | 8/1957 | Orsino | 60—35.6 |
| 2,917,424 | 12/1959 | Hirsch et al. | 154—117 |
| 2,129,875 | 9/1938 | Rost | 102—49 |
| 2,799,987 | 7/1957 | Chandler | 102—98 |

BENJAMIN A. BORCHELT, *Primary Examiner.*

ARTHUR M. HORTON, SAMUEL FEINBERG, *Examiners.*

F. J. LEES, R. F. STAHL, *Assistant Examiners.*